United States Patent
Chang et al.

(10) Patent No.: US 7,734,064 B2
(45) Date of Patent: Jun. 8, 2010

(54) METHOD AND APPARATUS FOR CLASSIFYING GEOLOGICAL MATERIALS USING IMAGE PROCESSING TECHNIQUES

(75) Inventors: Yoon Seop Chang, Daejeon (KR); Kyung Ok Kim, Daejeon (KR); Sung Woong Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 862 days.

(21) Appl. No.: 11/605,684

(22) Filed: Nov. 28, 2006

(65) Prior Publication Data

US 2007/0133866 A1  Jun. 14, 2007

(30) Foreign Application Priority Data

Dec. 8, 2005  (KR) .................. 10-2005-0119995

(51) Int. Cl.
G06K 9/00 (2006.01)
G09G 5/00 (2006.01)

(52) U.S. Cl. .................. 382/109; 345/581; 382/165

(58) Field of Classification Search .................. 382/109, 382/118, 159, 162, 165, 170, 190, 198, 224, 382/227, 307; 250/253; 345/581, 591
See application file for complete search history.

(56) References Cited

U.S. PATENT DOCUMENTS 4,783,751 A * 11/1988 Ehrlich et al. .................. 702/11
5,781,650 A 7/1998 Lobo et al.
6,140,643 A * 10/2000 Brown et al. .................. 850/10

FOREIGN PATENT DOCUMENTS

| JP | 7-44710 | 2/1995 |
|---|---|---|
| JP | 8 320930 | 12/1996 |
| JP | 2002-245465 | 8/2002 |
| JP | 2003-344163 | 12/2003 |
| JP | 2004-272565 | 9/2004 |
| KR | 100285568 B1 | 1/2001 |
| KR | 10200050031767 A | 4/2005 |

\* cited by examiner

*Primary Examiner*—Abolfazl Tabatabai
(74) *Attorney, Agent, or Firm*—LRK Patent Law Firm

(57) ABSTRACT

Provided is a method and apparatus for classifying geological materials using image processing techniques. The method and apparatus classify geological materials including stones, rock samples, and rock surfaces according to type and state by sequentially applying image processing techniques, such as a color space analysis, a granulometry analysis, texture parameter extraction and texture statistics extraction, to digital images of the geological materials. Since the method and apparatus extract quantitative figures that represent an entire image region by applying various image processing techniques, such as the color space analysis, the granulometry, the texture parameter extraction and the texture statistics extraction, to the digital images of the geological materials, the geological materials can be classified, which is not possible using a conventional image processing technique.

10 Claims, 5 Drawing Sheets

METHOD AND APPARATUS FOR CLASSIFYING GEOLOGICAL MATERIALS USING IMAGE PROCESSING TECHNIQUES

This application claims the priority of Korean Patent Application No. 10-2005-0119995, filed on Dec. 8, 2005, in the Korean Intellectual Property Office, the disclosure of which is incorporated herein in its entirety by reference.

BACKGROUND OF THE INVENTION

1. Field of the Invention

The present invention relates to a method and apparatus for classifying geological materials using image processing techniques, and more particularly, to a method and apparatus for classifying geological materials including stones, rock samples, and rock surfaces according to type and state by sequentially applying image processing techniques, such as a color space analysis, a granulometry, a texture parameter extraction and a texture statistics extraction, to digital images of the geological materials photographed.

2. Description of the Related Art

Conventional methods of classifying geological materials according to type and state mostly rely on experiential judgments of a few geologists. Since the conventional methods are based on a qualitative, not quantitative, analysis, they have revealed limitations in classifying geological materials. In various fields, image processing techniques are used to objectively and automatically classify target objects. However, techniques for classifying geological materials, such as stones and rocks, using image processing techniques are virtually non-existent.

Most of the conventional classification methods using image processing techniques classify some components within an image. For example, roads and buildings are extracted from a satellite image or defects are found in an image of a semiconductor.

The present invention is fundamentally different from such conventional classification methods in that the present invention aims to classify photographed objects themselves according to type and state, not some components in an image.

There are a number of conventional classification methods, such as a method of classifying cars according to type, which share similar objectives with the present invention. However, such conventional classification methods are also different from the present invention in that some components, such as a car's axes, in the case of the method of classifying cars according to type, are extracted from an image and objects are classified using the extracted components in the conventional classification methods.

As described above, the conventional methods of classifying geological materials according to type and state heavily rely on experiential judgments of a few geologists. Since the conventional classification methods are not based on a quantitative analysis, classification results obtained using the conventional classification methods are not regarded as reliable and objective results. In addition, it is difficult to secure experts in this area, and it is time consuming, and incurs high costs When geological materials are classified using image processing techniques, it is difficult to extract the shapes of components of an image since geological materials, such as stones, rock samples, and rock surfaces, have non-uniform image characteristics.

SUMMARY OF THE INVENTION

The present invention provides a method and apparatus for classifying geological materials without relying on experiential judgments of geologists by sequentially applying various image processing techniques to images of the geological materials having non-uniform characteristics and extracting quantitative figures that represent an entire image.

According to an aspect of the present invention, there is provided a method of classifying geological materials using image processing techniques, the method including: correcting the color of an input image of a geological material to be classified; analyzing a color space of the color-corrected image and obtaining a color component value and a change of the color component value; analyzing the granularity of the geological material represented by the color-corrected image; analyzing the texture of the geological material represented by the color-corrected image; and performing a predetermined learning based on the results of the color analysis, the granularity analysis and the texture analysis, and classifying the geological material.

According to another aspect of the present invention, there is provided an apparatus for classifying geological materials using image processing techniques, the apparatus including: a color correction unit receiving an input image photographed together with a predetermined standard color chart, correcting the color of the input image, and outputting the color-corrected image; a color space analysis unit receiving the color-corrected image, analyzing at least one type of color space of the color-corrected image, and outputting a color component value and an amount of change of the color component value; a granulometry unit extracting a brightness image from the color-corrected image, performing an operation used in mathematical morphology on the brightness image, and outputting the granularity of the color-corrected image; a texture analysis unit receiving the color-corrected image and extracting predetermined texture parameters and texture statistics; and a classification unit determining a geological material of the input image based on the color component value, the amount of change of the color component value, the texture parameters, and the texture statistics.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
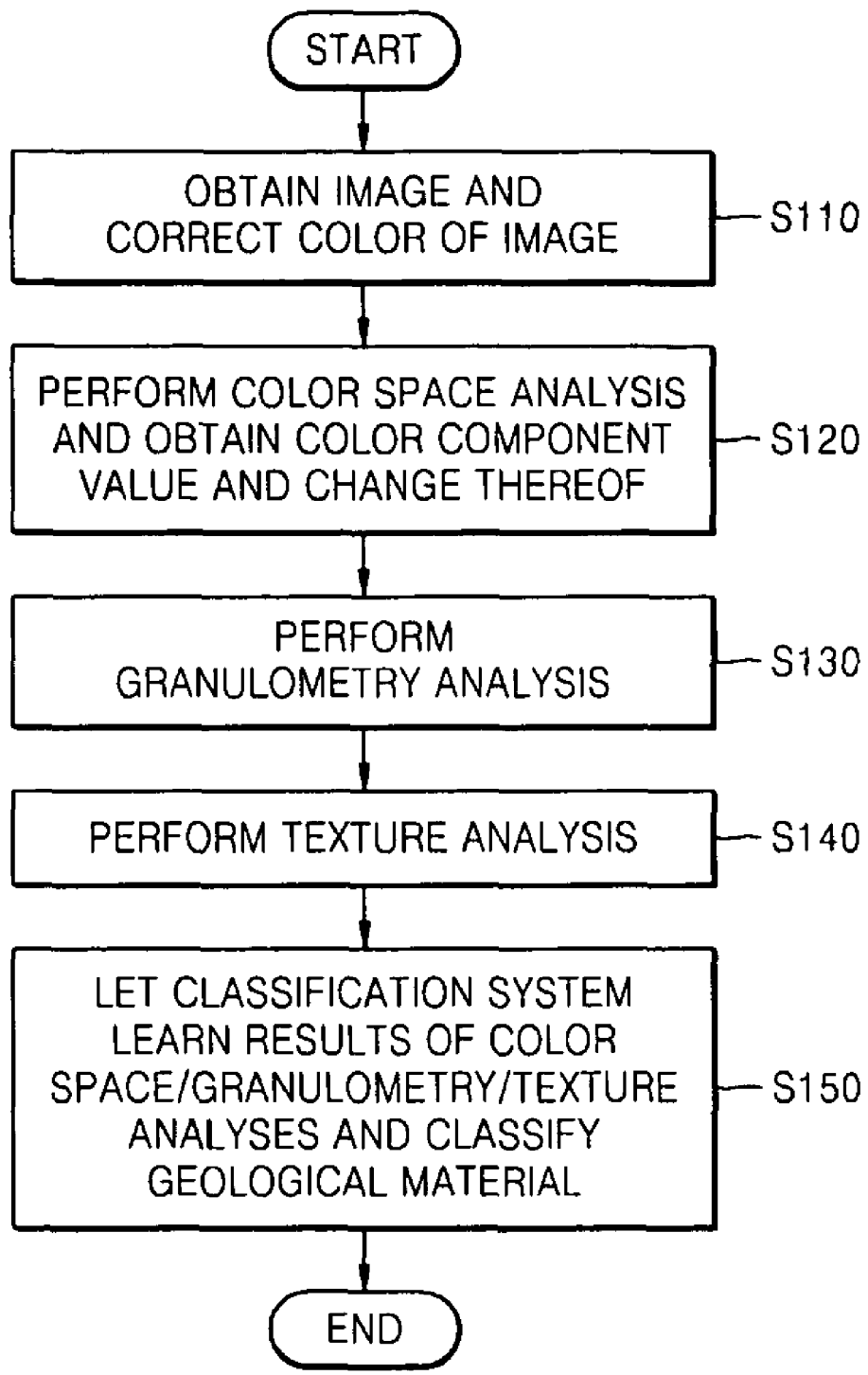
FIG. 1 is a flowchart illustrating a method of classifying geological materials using image processing techniques according to an embodiment of the present invention.
Figure 2:
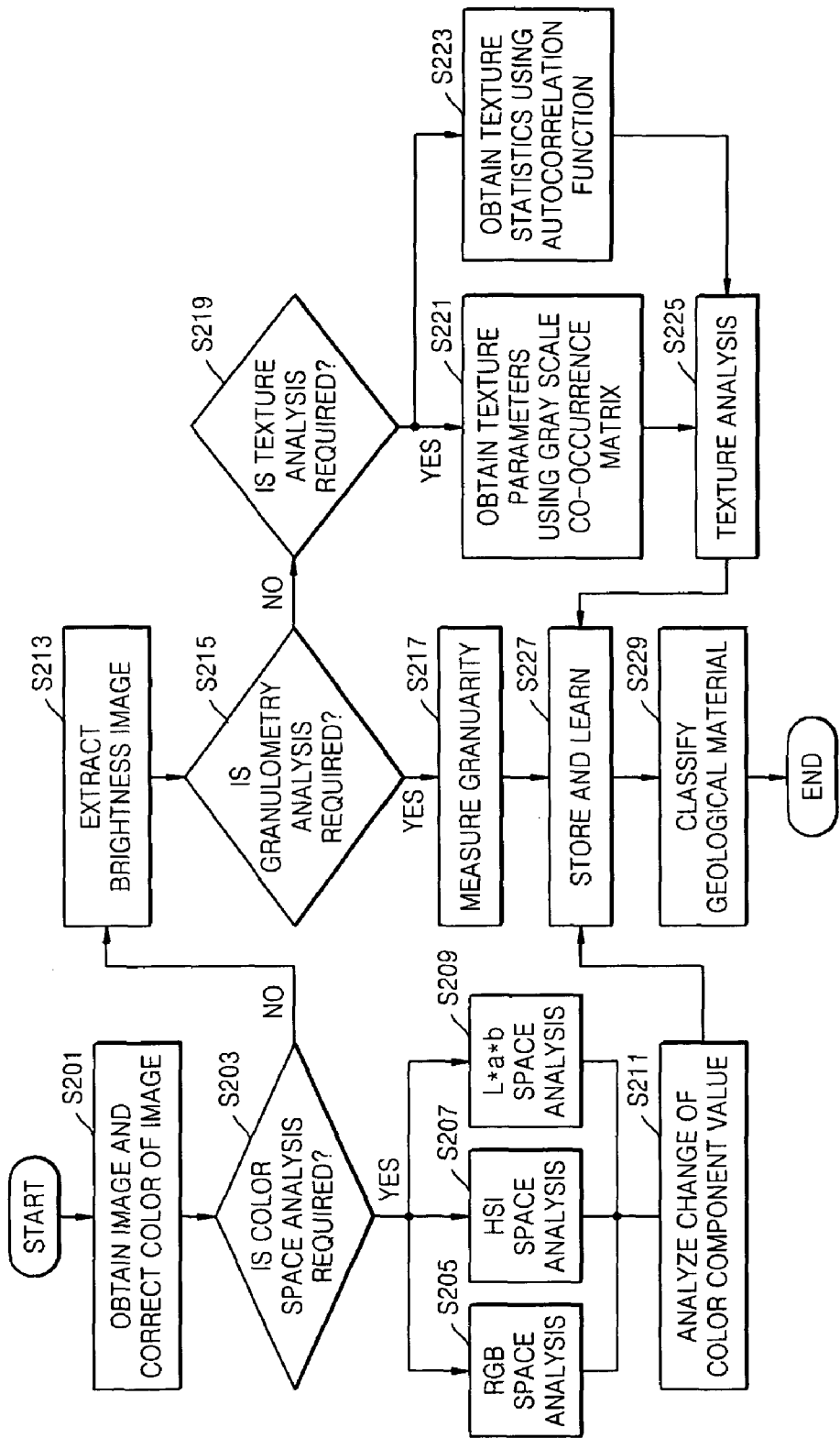
FIG. 2 is a detailed flowchart illustrating the method of FIG. 1.
Figure 3:
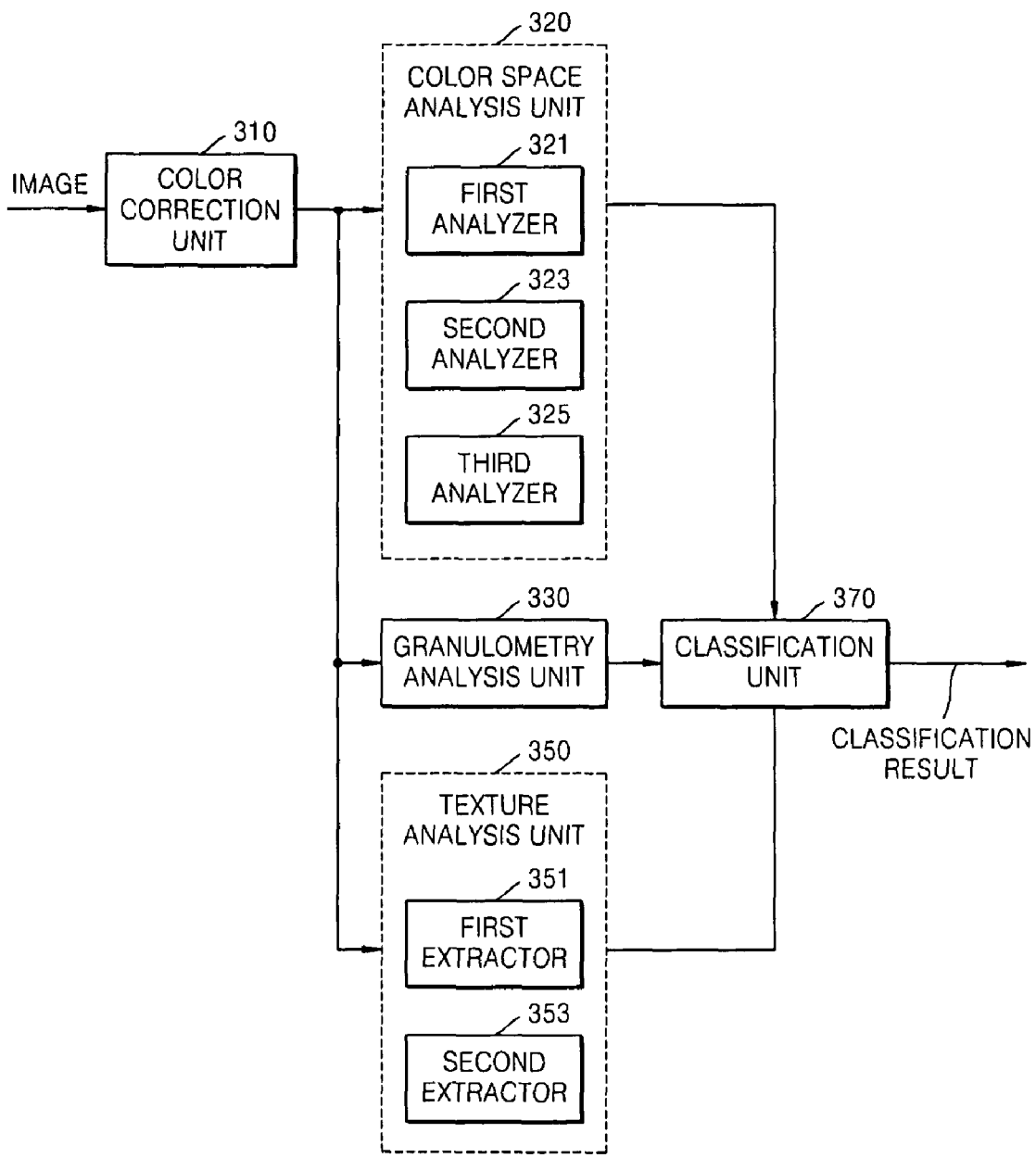
FIG. 3 is a block diagram of an apparatus for classifying geological materials using image processing techniques according to an embodiment of the present invention.

FIG. 1 is a flowchart illustrating a method of classifying geological materials using image processing techniques according to an embodiment of the present invention. FIG. 2 is a detailed flowchart illustrating the method of FIG. 1. FIG. 3 is a block diagram of an apparatus for classifying geological materials using image processing techniques according to an embodiment of the present invention.

The method of classifying geological materials using the image processing technique will now be described with reference to FIGS. 1 and 3. A color correction unit 310 receives an image of a geological material to be classified and corrects the color of the image in operation S110. Such color correction is performed using a standard color chart, which will be described later. A color space analysis unit 320 performs a red, green and blue (RGB) color space analysis, a hue, saturation and intensity (HSI) color space analysis and a L*a*b* color space analysis on the color-corrected image. The color space analysis unit 320 then obtains a color component value and the change of the color component value in operation S120. Then, a granulometry unit 330 extracts a brightness image from the color-corrected image and performs granulometry using mathematical morphology in operation S130. A texture analysis unit 351 performs a texture analysis by applying a gray scale co-occurrence matrix and an autocorrelation function to the color-corrected image and extracts texture parameters and texture statistics in operation S140. A classification unit 370 receives the color component value and the change thereof, the result of granulometry and the result of the texture analysis. The classification unit 370 then performs learning, analyzes the geological material, and outputs the analysis result in operation S150.

Figure 4:
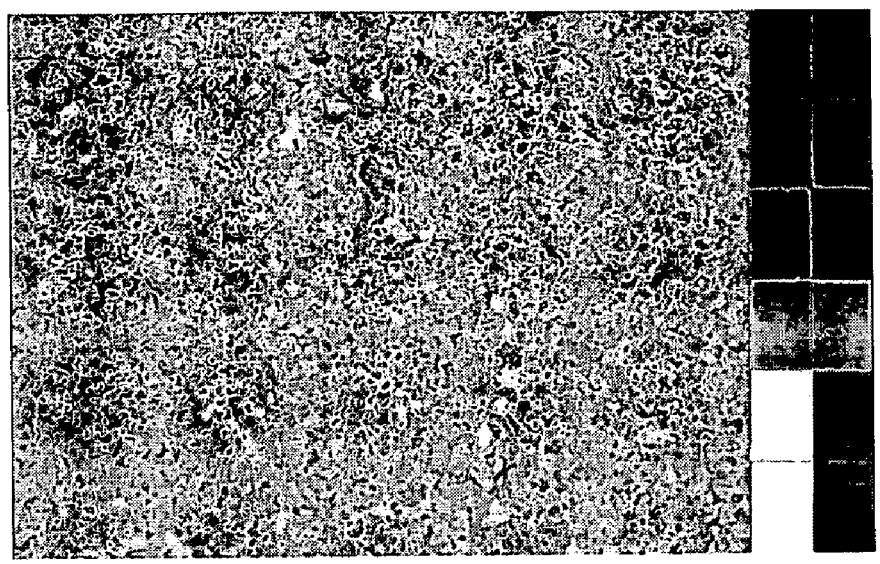
FIG. 4 illustrates an exemplary image of a geological material photographed together with a standard color chart for color correction.

The method will now be described in more detail with reference to FIGS. 2 and 3. The color correction unit 310 receives a digital image of a geological material from a digital camera or a video camera. Color correction is required to compare and analyze images of different geological materials under the same condition. The color correction unit 310 may use a color correction method using the standard color chart. Each patch on the standard color chart has a predetermined color component value in a predetermined standard condition. When an image of a geological material as illustrated on the left of FIG. 4 is photographed together with the standard color chart on the right of FIG. 4, the color of the image can be corrected using a standard condition in operation S201.

It is determined whether a color space analysis is required in operation S203. If required, a first analyser 321 of the color space analysis unit 320 performs a statistical analysis, such as an analysis of average and standard deviation, on an RGB color space of the color-corrected image and outputs the analysis result in operations S205 and S211. A second analyser 323 of the color space analysis unit 320 performs the statistical analysis on an HSI color space of the color-corrected image and outputs the analysis result in operations S207 and S211. A third analyser 325 of the color space analysis unit 320 measures a displacement vector (whose size is proportional to a color change) of the L*a*b* color space of the color-corrected image and analyzes the change of the displacement vector in operations S209 and S211. These analysis results may be integrated and analysed accordingly in operation S211.

Figure 5A:
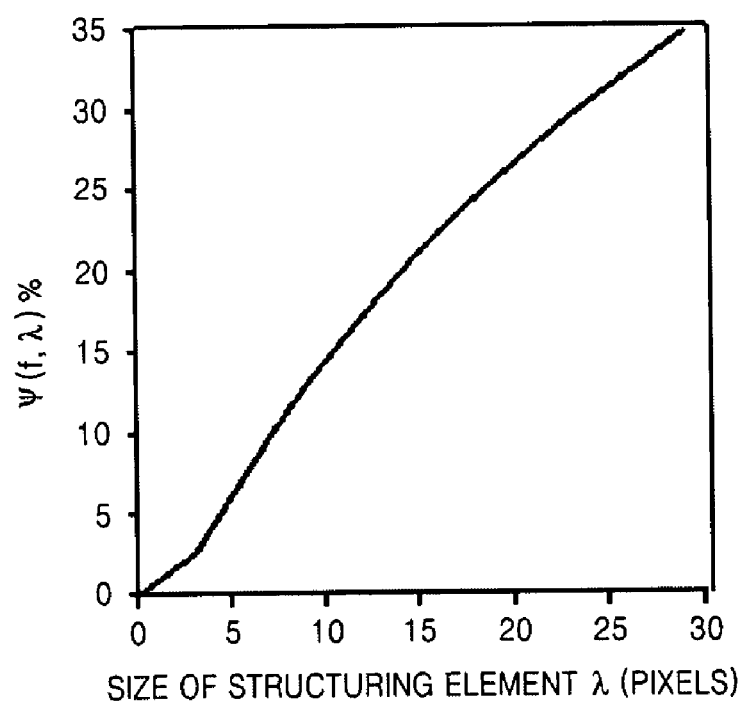
FIG. 5A is a graph illustrating a granularity cumulative curve obtained by a granulometry using mathematical morphology.
Figure 5B:
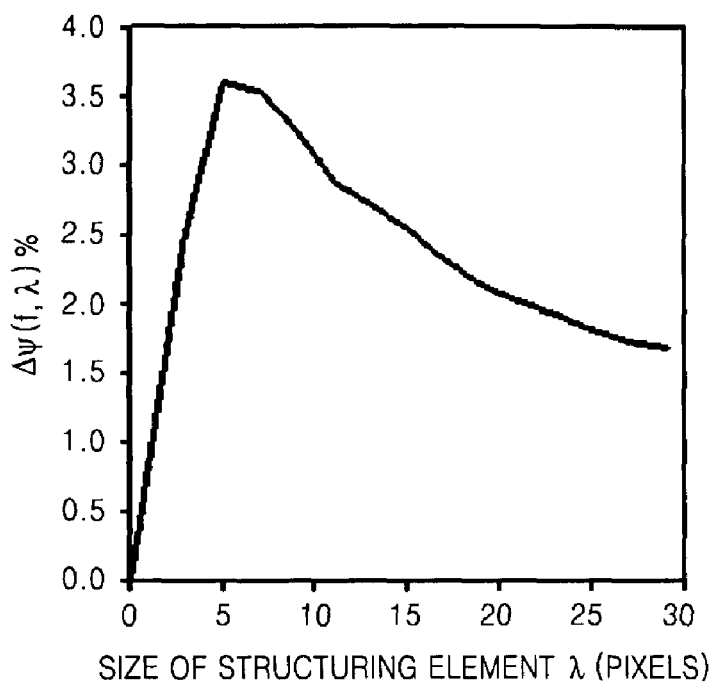
FIG. 5B is a graph illustrating a granularity density curve obtained by the granulometry using mathematical morphology.

The granulometry unit 330 extracts a brightness image while performing a color analysis in operation S213. The granulometry unit 330 determines whether the granulometry is required in operation S215. When the granulometry unit 330 determines that the granulometry is required, the granulometry unit 330 performs the granulometry using mathematical morphology. Mathematical morphology relates to a combination of four operations, that is, an erosion operation, a dilation operation, an opening operation and a closing operation performed on an original image using a kind of a window (kernel) called a structuring element to obtain various useful image processing results. The granulometry unit 330 increases a size of the structuring element and repeatedly performs the opening operation to obtain a granularity cumulative curve of FIG. 5A and a granularity density curve of FIG. 5B, and performs the granulometry on the geological material using figures shown in these curves in operation S227.

The texture analysis unit 350 determines whether the texture analysis is required. When required, the texture analysis unit 350 obtains texture parameters and texture statistics and performs the texture analysis using the same. More specifically, a first extractor 351 calculates a gray scale co-occurrence matrix based on an original image and obtains texture parameters in operation S221. The gray scale co-occurrence matrix may be used for the texture analysis to identify spatial reliance of brightness values between pixels in an image. Four quantitative texture parameters, that is energy, entropy, contrast and homogeneity, extracted from the gray scale co-occurrence matrix may be used for analysing the geological material.

Figure 6:
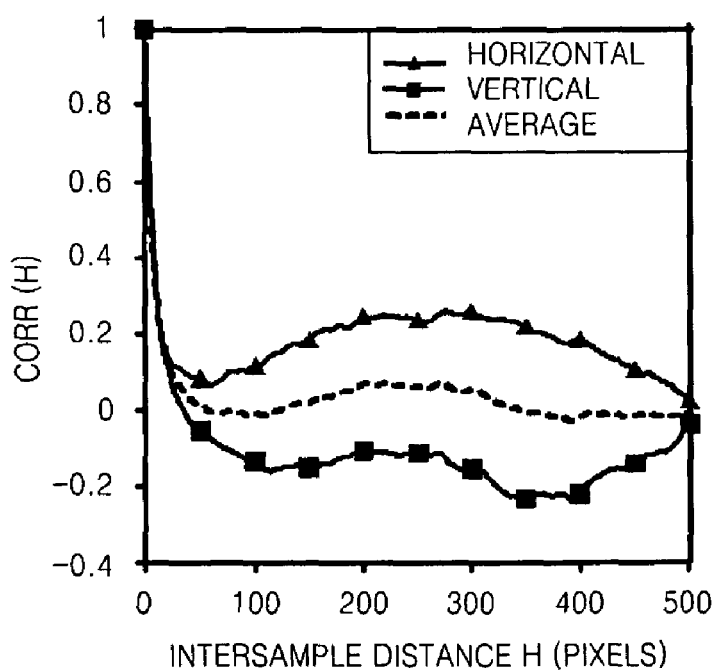
FIG. 6 is a correlogram graph illustrating a correlation obtained using an autocorrelation function, which is a statistical technique.

The structure of texture is classified into a coarse structure and a dense structure according to the sizes of texture elements that constitute the texture. The sizes of the texture elements can be measured by applying the autocorrelation function, which is one of the statistical techniques, to an image. A second extractor 353 applies the autocorrelation function to the image of the geological material, obtains a correlogram graph as illustrated in FIG. 6, and analyzes the texture of the geological material using texture statistics (sizes of texture elements) shown in the graph in operation S223. In this case, a horizontal correlation, a vertical correlation, and an average of the same may be used.

The classification unit 370 combines the result of the color analysis in operation S211, the result of the granulometry in operation S217 and the result of the texture analysis in operation S225, stores the combined results in a database, and learns the combined results through an artificial neural network in operation S227. The classification unit 370 finally classifies the geological material using these results in operation S229.

As described above, a method and apparatus for classifying geological materials using image processing techniques according to the present invention extracts quantitative figures which represent an entire image region using various image processing techniques such as a color space analysis, a granulometry, a texture parameter extraction, and a texture statistics extraction. Therefore, geological materials can be classified, which was not possible using conventional image processing techniques.

The method and apparatus extract and compare quantitative figures from an image of a geological material using the image processing techniques. Therefore, the geological material can be objectively and automatically classified without relying on the experiential judgments of geologists. And thus, the reliability of the classification results can be secured.

In addition, the method and apparatus extract quantitative figures which represent an entire image in consideration of non-uniform characteristics of images of geological materials, from which it is difficult to extract components, and classify the geological materials. Therefore, the reliability of the classification results can be secured.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). In addition, a font stored in ROM data structure according to the present invention can be implemented as computer-readable code in a computer-readable recording medium such as ROM, RAM, CD-ROMs, magnetic tapes, floppy disks, and optical data storage devices.

The computer-readable recording medium can also be distributed over network-coupled computer systems so that the computer-readable code is stored and executed in a distributed fashion. Also, functional programs, code, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of classifying geological materials using image processing techniques, the method comprising:
   correcting the color of an input image of a geological material to be classified;
   analyzing a color space of the color-corrected image and obtaining a color component value and a change of the color component value;
   analyzing the granularity of the geological material represented by the color-corrected image;
   analyzing the texture of the geological material represented by the color-corrected image;
   and performing a predetermined learning based on the results of the color analysis, the granularity analysis and the texture analysis, and classifying the geological material, wherein the analysis of the granulometry of the geological material comprises:
   extracting a brightness image from the color-corrected image;
   repeating an opening operation used in mathematical morphology on the brightness image while varying a window which is a structuring element and obtaining a granularity cumulative curve and a granularity density curve; and
   obtaining the granularity of the geological material based on figures on the granularity cumulative curve and the granularity density curve.

2. The method of claim 1, wherein the correction of the color of the input image comprises:
   generating a standard color chart in which each patch has a predetermined color component value in a predetermined standard condition; and
   comparing the input image with the standard color chart and correcting the color of the input image.

3. The method of claim 1, wherein the analysis of the color space of the color-corrected image comprises collecting and analyzing the color component value and the change of the color component value using at least one of statistics of a red, green and blue (RGB) color space, a hue, saturation and intensity (HSI) color space, and a displacement vector of an L*a*b* color space.

4. The method of claim 1, wherein the analysis of the texture of the geological material comprises:
   extracting at least one texture parameter; and extracting at least one texture statistic and performing the texture analysis.

5. The method of claim 4, wherein the extracting at least one texture parameter comprises:
   applying a predetermined gray scale co-occurrence matrix to the color-corrected image; and
   obtaining the at least one texture parameter comprising energy, entropy, contrast and homogeneity as the application result.

6. The method of claim 4, wherein the extracting at east one texture statistic comprises:
   obtaining texture statistics comprising sizes of texture elements by applying an autocorrelation function to the color-corrected image; and
   analyzing the texture of the geological material based on at least one texture parameter and at least one texture statistic.

7. The method of claim 1, further comprising selecting and performing, in parallel, at least one of the color space analysis, the granulometry, and the texture analysis.

8. An apparatus for classifying geological materials using image processing techniques, the apparatus comprising:
   a color correction unit receiving an input image photographed together with a predetermined standard color chart, correcting the color of the input image, and outputting the color-corrected image;
   a color space analysis unit receiving the color-corrected image, analyzing at least one type of color space of the color-corrected image, and outputting a color component value and an amount of change of the color component value;
   a granulometry unit extracting a brightness image from the color-corrected image, performing an operation used in mathematical morphology on the brightness image, and outputting the granularity of the color-corrected image;
   a texture analysis unit receiving the color-corrected image and extracting predetermined texture parameters and texture statistics; and
   a classification unit determining a geological material of the input image based on the color component value, the amount of change of the color component value, the texture parameters, and the texture statistics, wherein the texture analysis unit comprises:
   a first extractor generating a gray scale co-occurrence matrix, applying the gray scale co-occurrence matrix to the color-corrected image, calculating texture parameters comprising energy, entropy, contrast and homogeneity, and outputting the texture parameters; and a second extractor applying an autocorrelation function to the color-corrected image, calculating texture statistics comprising the sizes of texture elements, and outputting the texture statistics.

9. The apparatus of claim 8, wherein the color space analysis unit comprises:

a first analyzer performing an RGB space analysis on the color-corrected image and generating an RGB color component value and the amount of change of the RGB color component value;

a second analyzer performing an HSI space analysis on the color-corrected image and generating an HSI color component value and the amount of change of the HSI color component value; and a third analyzer performing an L*a*b* space analysis on the color-corrected image and generating an L*a*b* color component value and the amount of change of the L*a*b* color component value.

10. The apparatus of claim 8, wherein the texture analysis unit comprises:

a first extractor generating a gray scale co-occurrence matrix, applying the gray scale co-occurrence matrix to the color-corrected image, calculating texture parameters comprising energy, entropy, contrast and homogeneity, and outputting the texture parameters; and a second extractor applying an autocorrelation function to the color-corrected image, calculating texture statistics comprising the sizes of texture elements, and outputting the texture statistics.

* * * * *